UNITED STATES PATENT OFFICE.

FRANCIS A. HALSEY, OF SAN RAFAEL, CALIFORNIA.

SMOKELESS POWDER.

SPECIFICATION forming part of Letters Patent No. 568,902, dated October 6, 1896.

Application filed March 16, 1896. Serial No. 583,331. (No specimens.)

*To all whom it may concern:*

Be it known that I, FRANCIS A. HALSEY, a citizen of the United States, residing at San Rafael, county of Marin, State of California, have invented an Improvement in Smokeless Powders; and I hereby declare the following to be a full, clear, and exact description of the same.

My invention relates to improvements in the manufacture of explosive compounds, and especially to that class known as "smokeless gunpowders."

It consists in the composition of ingredients which will be more fully explained by reference to the following specification.

In the manufacture of my improved powder I employ nitrate of strontia, ammonium picrate, potassium bichromate, potassium permanganate. These are mixed in approximately the following proportions: nitrate of strontia, twenty-three per cent.; ammonium picrate, fifty per cent.; potassium bichromate, twenty per cent.; potassium permanganate, seven per cent.; but these proportions may be varied somewhat without materially altering the character of the compound.

In preparing my powder I first grind or pulverize the ammonium picrate and the nitrate of strontia into fine powder, then dissolve the potassium bichromate and potassium permanganate separately in boiling water. The ammonium picrate and the potassium bichromate are then mixed, so as to form a pasty compound, the boiling solution of potassium permanganate is added slowly, so as to prevent too rapid an effervescence, and the nitrate of strontia is finally added to the mass, which is thoroughly mixed, forming a stiff paste, which is afterward dried at a low temperature and then granulated in any suitable or well-known manner to provide a powder of suitable form for use in small-arms of any description.

Having thus described my invention, what I claim as new, and desire to secure by Letters Patent, is—

A compound consisting of nitrate of strontia, ammonium picrate, potassium bichromate and potassium permanganate as described.

In witness whereof I have hereunto set my hand.

FRANCIS A. HALSEY.

Witnesses:
GEO. H. STRONG,
S. H. NOURSE.